(No Model.)
S. B. HART.
FORCE FEED FERTILIZER ATTACHMENT FOR GRAIN DRILLS.
No. 277,719. Patented May 15, 1883.
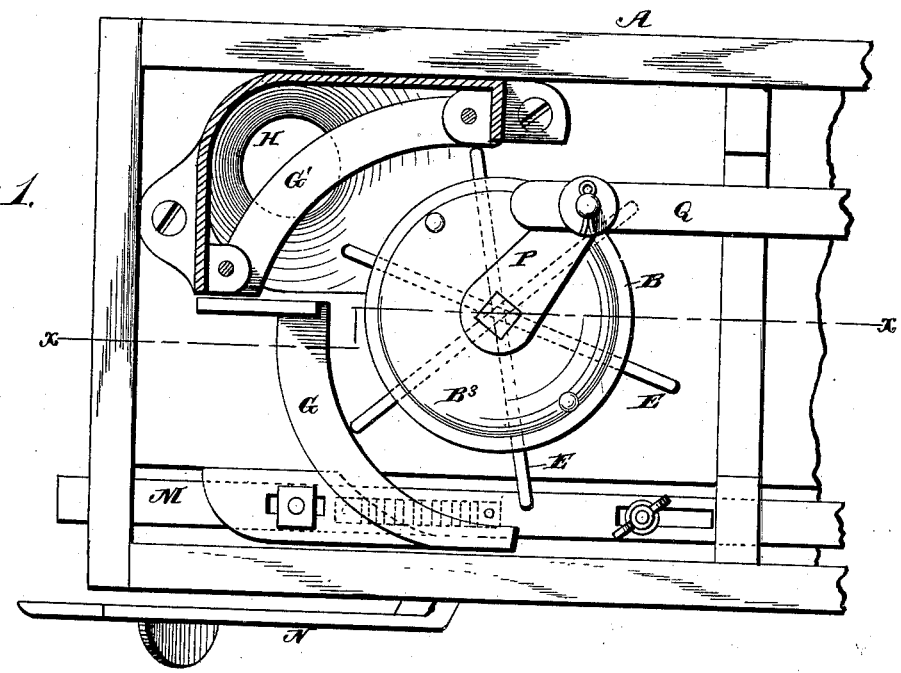
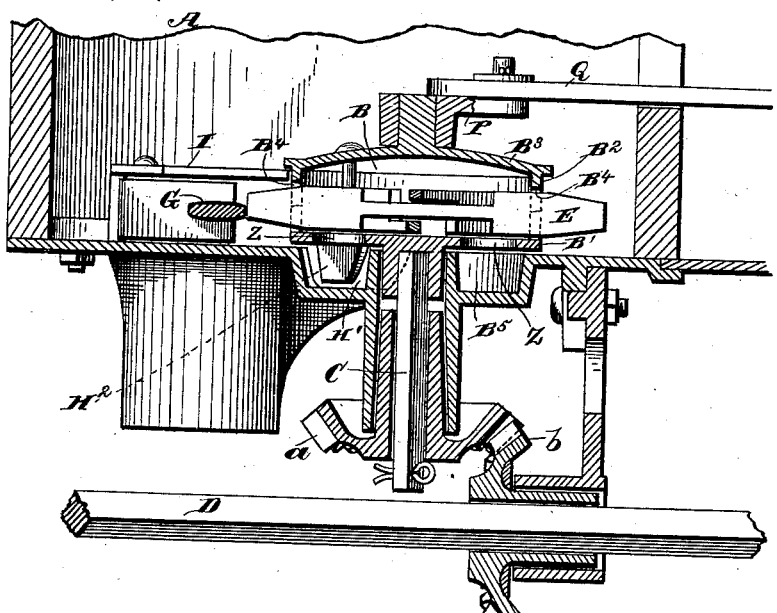
Witnesses.
Robert Everett,
A. H. Norris.
Inventor:
Stacy B. Hart,
By James L. Norris.
Atty (No Model.) 2 Sheets—Sheet 2.
S. B. HART.
FORCE FEED FERTILIZER ATTACHMENT FOR GRAIN DRILLS.
No. 277,719. Patented May 15, 1883.
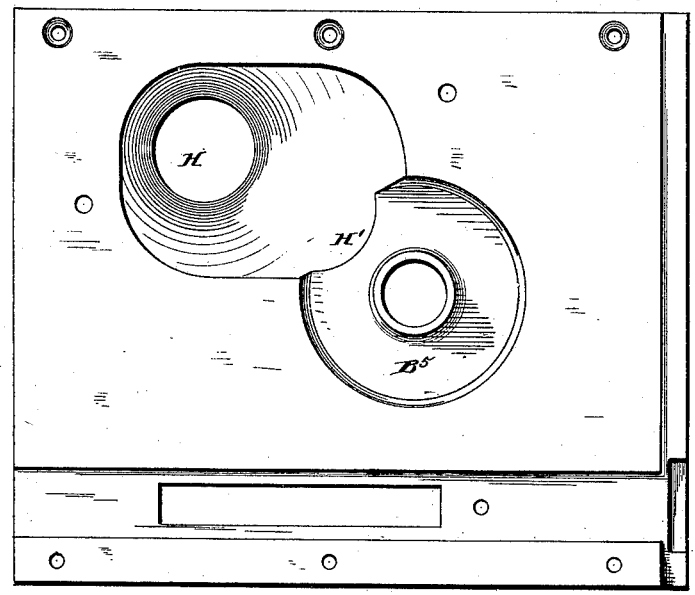
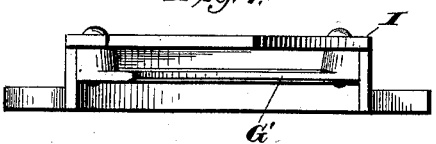
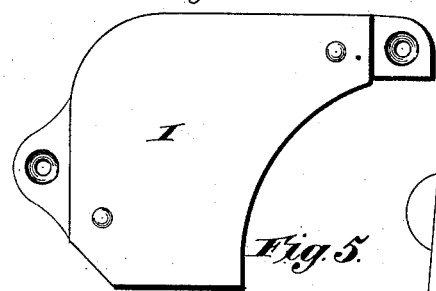
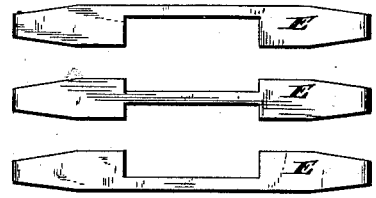
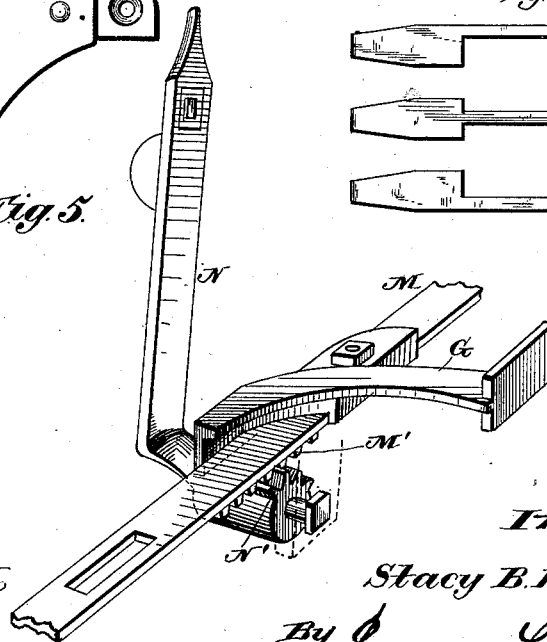
Witnesses.
Robert Everett
A. H. Norris
Inventor.
Stacy B. Hart.
By James L. Norris.
Atty.

UNITED STATES PATENT OFFICE.

STACY B. HART, OF PEORIA, ILLINOIS.

FORCE-FEED FERTILIZER ATTACHMENT FOR GRAIN-DRILLS.

SPECIFICATION forming part of Letters Patent No. 277,719, dated May 15, 1883.

Application filed March 24, 1883. (No model.)

*To all whom it may concern:*

Be it known that I, STACY B. HART, a citizen of the United States, residing at Peoria, in the county of Peoria and State of Illinois, have invented new and useful Improvements in Force-Feed Fertilizer Attachments for Grain-Drills, of which the following is a specification.

This invention relates to improvements in force-feed fertilizer-distributers, in which a series of horizontal revolving disks operate on the apertured bottom of a partitioned hopper for forcing the fertilizing material out through the hopper-apertures into the tubes or conductors leading to the ground.

Prior devices of this description have not proved entirely satisfactory, because the mass of closely-packed fertilizing material is liable to clog the discharge-apertures and impede the free rotation of the distributing or feeding devices; and the chief object of my invention is to obviate these defects by providing a distributing device which is positive in its action and will effectually force regular charges of fertilizing material through the discharge-orifice in the hopper-bottom, provision being also made for varying the quantity of material discharged, all in such manner that the "banking up" or packing of the material in the hopper is effectually prevented.

The invention consists in the construction and combination of parts, which will be hereinafter more fully described and claimed.

In the drawings, Figure 1 is a plan or top view of my improved force-feed fertilizer attachment for grain-drills. Fig. 2 is a longitudinal sectional view on the line $x \, x$ of Fig. 1. Fig. 3 is a plan view of the bottom plate for one of the compartments of the hopper. Fig. 4 is a detail side view of the cover-plate to the discharge-orifice. Fig. 5 is a detail perspective view of the adjustable abutment or device for actuating the plungers or blades and regulating the discharge of material from the hopper; Fig. 6, detail views of the plungers or blades, and Fig. 7 a detached view of the cover-plate to the discharge-orifice.

I have in the present instance illustrated only a portion of a divided or partitioned hopper, A, since the construction and arrangement of a complete series of boxes, with their feeding or distributing devices, is the same as herein shown for a single hopper. The hopper is intended to be located in rear or in front of the seed-box of a grain-drill in such relation to the conductor-spout leading to the ground that the grain and fertilizing material are dropped into the same drill. The hopper A contains a force-feed distributing device in the form of a horizontal revolving disk, B, which is mounted on a vertical shaft or axis, C, passing through the bottom of the hopper, and having a bevel spur-wheel, $a$, at its lower end, which gears into a corresponding wheel, $b$, on the horizontal driving-shaft D, receiving motion from the axle of the ground-wheels, or operated in any other suitable manner.

The distributing device or horizontal disk consists of a bottom plate, B', a vertical circumferential flange or rim, $B^2$, and a top plate, $B^3$, which members are held together by screws, bolts, or other fastening devices. The rim or flange is provided with apertures $B^4$, arranged at equal distances apart, and through these apertures are passed plungers or blades E, which cross or intersect each other, as shown in Figs. 1 and 2. One of the plungers has its central portion reduced in thickness, and the other two are respectively cut away or provided with gains on their upper and lower surfaces, respectively, as is shown in Fig. 6. In this manner the end portions of the different plungers or blades are brought into the same horizontal plane, as will readily be apparent. The plungers or blades are free to reciprocate back and forth the distributing-disk, and this movement of the plungers is produced by means of an abutment or curved plate, G G', extending transversely within the feed-hopper, and made in two parts. The stationary part G of the abutment is arranged over one edge of a discharge aperture or spout, H, in the bottom of the hopper, and has a horizontal top plate or cap, 1, made of a segmental shape, as shown in Fig. 7. The curved plate G', together with the horizontal cap-plate, constitutes a hood or chamber, which is arranged directly above the discharge-opening, so as to prevent the superimposed mass of fertilizing material from passing to said opening, except in the following manner: The rotation of the horizontal feed-disk will cause the plungers or blades thereof to be projected when they reach a point opposite the outer end of the abutment or the feeding side thereof. During the onward movement of the feed-disk the plungers glide along the abutment and force the material, in regular quantities or charges, toward the discharge-opening, through which the material falls, to be delivered to the drill in the manner already stated. The plungers move in contact with the entire abutment, if the movable part of the latter stands in the position shown in dotted lines, Fig. 1, and in passing over the abutment the opposite ends of the plungers are projected to such an extent that the charge of material to be next delivered or discharged is swept onward at the feed side of the abutment. The bottom plate of the hopper is constructed with a pocket, $B^5$, in the form of an annular channel, which connects with the discharge-orifice H, as at H', Fig. 3, and in this channel is arranged to travel an obliquely-arranged blade or scraper, $H^2$, fixed to the bottom plate of the revolving wheel or disk. The object of this channel and blade or scraper is to discharge through the passage H' and orifice H any material that may gain access to the under side of the wheel or disk. The bottom plate of the feed-disk is provided with several openings, Z, which serve as discharge-apertures for any material that may enter through the apertures in which the plungers operate.

The part G of the abutment is made adjustable relatively to the discharge opening or spout, so as to vary the size of the latter or the position thereof over which the plungers can sweep, and in this manner the amount of material discharged can be regulated. The adjustment of the abutment is effected by means of a longitudinal bar, M, which extends through the hopper or the series of hoppers, and is connected with the entire series of abutments. A lever, N, pivoted to the under side of the hopper, and provided with a toothed segment, N', engaging a rack, M', on the under side of the bar M, serves to move the said bar, and thus adjust the movable part of the abutment.

In order to agitate the material in the hopper or box and prevent the same from banking up or becoming packed, I provide the upper part of the axis of the feeding device with a crank and wrist-pin, P, and connect therewith a longitudinal bar, Q, which extends through all the boxes and reciprocates or oscillates therein for stirring the contents thereof. The bar Q may be connected with the cranks of the feed-disks located at the ends of the hopper, or with the cranks of an end disk and any intermediate disk; or, if desired, a series of agitator-bars, or a bar made of jointed sections, may be connected with and operated by the cranks of each adjoining pair of disks.

Having thus described my invention, what I claim is—

1. The combination of a horizontal revolving disk having apertures in its periphery or rim, a series of horizontally-reciprocating plungers or blades projecting through and operating in said apertures, and a curved abutment arranged at the side of said revolving disk, with a hopper having an apertured bottom, substantially as and for the purpose set forth.

2. The combination of a hopper having a discharge-orifice in its bottom, a feed-disk arranged to rotate horizontally at the bottom of the hopper, and provided with horizontally-movable plungers for forcing the material from the hopper to the discharge-orifice, a movable abutment arranged to act on the plungers, and means for adjusting the abutment to vary the feed of the plungers, substantially as described.

3. The combination of an abutment composed of the curved stationary part G', a horizontal cap-plate, I, and a movable part, G, with a feed-disk provided with horizontally-reciprocating plungers or blades adapted to pass beneath the cap-plate, and a hopper having a disk or orifice, substantially as herein set forth.

4. A fertilizer-distributing device composed substantially of a perforated bottom plate, a vertical rim provided with apertures, a detachable cap-plate, a series of horizontally-reciprocating plungers or blades operating through the apertured rim, and a vertical axis or rotary shaft, in combination with a hopper or box having a discharge-orifice and a curved abutment arranged alongside said discharge-orifice, as and for the purpose set forth.

5. The combination of the longitudinal bar having a rack, the pivoted lever having a toothed portion engaging the rack, with the horizontally-adjustable abutment and hopper having an apertured bottom, as and for the purpose set forth.

In testimony whereof I have hereunto set my hand in the presence of two subscribing witnesses.

STACY B. HART.

Witnesses:
JOHN I. BROWN,
JACOB DARST.